US012124198B2

(12) United States Patent
Higuchi et al.

(10) Patent No.: US 12,124,198 B2
(45) Date of Patent: Oct. 22, 2024

(54) IMAGE FORMING METHOD AND IMAGE FORMING APPARATUS

(71) Applicant: BROTHER KOGYO KABUSHIKI KAISHA, Nagoya (JP)

(72) Inventors: Takayuki Higuchi, Anpachi (JP); Kumiko Sakaguchi, Nagoya (JP); Beibei Yang, Nagoya (JP); Norihiro Hirai, Wakayama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 518 days.

(21) Appl. No.: 17/617,564

(22) PCT Filed: May 12, 2020

(86) PCT No.: PCT/JP2020/018989
§ 371 (c)(1),
(2) Date: Dec. 8, 2021

(87) PCT Pub. No.: WO2020/255586
PCT Pub. Date: Dec. 24, 2020

(65) Prior Publication Data

US 2022/0244667 A1 Aug. 4, 2022

(30) Foreign Application Priority Data

Jun. 19, 2019 (JP) ................................ 2019-114078

(51) Int. Cl.
*G03G 15/20* (2006.01)
*G03G 9/087* (2006.01)

(52) U.S. Cl.
CPC ..... *G03G 15/2096* (2013.01); *G03G 9/08795* (2013.01); *G03G 9/08797* (2013.01)

(58) Field of Classification Search
CPC .......... G03G 15/2096; G03G 9/08795; G03G 9/08797; G03G 9/08755; G03G 9/08782; G03G 11/00
See application file for complete search history.

(56) References Cited

U.S. PATENT DOCUMENTS

2013/0142554 A1 6/2013 Obata et al.
2013/0259550 A1 10/2013 Shibata et al.
(Continued)

FOREIGN PATENT DOCUMENTS

JP 853-122431 A 10/1978
JP 2006-078573 A 3/2006
(Continued)

OTHER PUBLICATIONS

The State Intellectual Property Office of the People's Republic of China, First Office Action issued in Chinese Patent Application No. 202080043285.0, dated Nov. 6, 2023.
(Continued)

*Primary Examiner* — Stewart A Fraser
(74) *Attorney, Agent, or Firm* — Baker Botts L.L.P.

(57) ABSTRACT

An image forming method includes: forming a toner image on a sheet by using a toner including a first binder resin; and applying, to the toner image, a fixing solution capable of softening the first binder resin so as to fix the toner image to the sheet. The first binder resin is a condensate of a first alcohol component and a first carboxylic acid component. The first alcohol component contains 1,4-butanediol, and the first carboxylic acid component contains polyvalent carboxylic acid. A molar ratio of the 1,4-butanediol in the first alcohol component is not less than 30 mol %.

20 Claims, 2 Drawing Sheets

(56) References Cited

U.S. PATENT DOCUMENTS

| | | | | |
|---|---|---|---|---|
| 2014/0120465 | A1* | 5/2014 | Watanabe .......... | G03G 9/08755 430/108.2 |
| 2018/0217543 | A1 | 8/2018 | Kakigahara et al. | |
| 2020/0310272 | A1 | 10/2020 | Higuchi et al. | |

FOREIGN PATENT DOCUMENTS

| | | | |
|---|---|---|---|
| JP | 2008-139504 | A | 6/2008 |
| JP | 2011-150285 | A | 8/2011 |
| JP | 2013-140344 | A | 7/2013 |
| JP | 2013-246377 | A | 12/2013 |
| JP | 2014-137387 | A | 7/2014 |
| JP | 2017-068098 | | 4/2017 |
| WO | 2017/057684 | A1 | 4/2017 |
| WO | 2019/124432 | A1 | 6/2019 |
| WO | 2019/124433 | A1 | 6/2019 |
| WO | 2019/124434 | A1 | 6/2019 |

OTHER PUBLICATIONS

International Preliminary Report of Patentability (Chapter 1) PCT/JP2020/018989 issued Dec. 21, 2021.
Japan Patent Office, International Search Report issued in International Application No. PCT/JP2020/018989, mailed Jun. 23, 2020.
European Patent Office, Extended European Search Report issued in European Patent Application No. 20827174.2, mailed May 30, 2023.

* cited by examiner

IMAGE FORMING METHOD AND IMAGE FORMING APPARATUS

CROSS-REFERENCE TO RELATED APPLICATIONS

This application is a U.S. National Stage patent application under 37 U.S.C. § 371 of International Patent Application No. PCT/JP2020/018989, filed on May 12, 2020, which claims the benefit of Japanese Patent Application No. JP 2019-114078, filed on Jun. 19, 2019, the disclosures of each of which are incorporated herein by reference in their entirety.

TECHNICAL FIELD

The present disclosures relate to an image forming method and an image forming apparatus.

BACKGROUND ART

There is conventionally known an image forming apparatus provided with a toner image forming part and a fixing part (see, Patent Literature 1 described below). The toner image forming part forms a toner image on a sheet. The fixing part applies a fixing solution to the toner image so as to fix the toner image to the sheet.

CITATION LIST

Patent Literature

Patent Literature 1: Japanese Patent Application Laid-Open No. JP2017-68098A

SUMMARY

Problem to be Solved by the Invention

In Patent Literature 1 as described above, however, in a case that the volatility of the fixing solution is low, the toner which has been soften by the fixing solution is hard to be cured.

Accordingly, in a case that a second sheet is superposed or overlaid on a first sheet on which the toner image is formed and to which the fixing solution is applied, the toner, of the first sheet, which is softened is transferred to the second sheet, in some cases. Further, the first sheet and the second sheet are stuck or adhered together due to the softened toner, in some cases.

Therefore, an object of the present disclosure is to provide an image forming method and an image forming apparatus each of which is capable of suppressing occurrence of such a situation that in a case that the second sheet is superposed on the first sheet on which the toner image is formed and to which the fixing solution is applied, the toner, of the first sheet, which is softened is transferred to the second sheet, and such a situation that the first sheet and the second sheet are stuck together due to the softened toner.

According to a first aspect of the present invention, there is provided an image forming method including: forming a toner image on a sheet by using a toner including a first binder resin; and applying, to the toner image, a fixing solution capable of softening the first binder resin so as to fix the toner image to the sheet. The first binder resin is a condensate of a first alcohol component and a first carboxylic acid component. The first alcohol component contains 1,4-butanediol, and the first carboxylic acid component contains polyvalent carboxylic acid. A molar ratio of the 1,4-butanediol in the first alcohol component is not less than 30 mol %.

According to a second aspect of the present invention, there is provided an image forming apparatus including: a toner image forming part which has a toner accommodating part accommodating a toner, and which is configured to form a toner image on a sheet by using the toner; and a fixing part configured to apply a fixing solution to the toner image so as to fix the toner image to the sheet. The toner is a condensate of a first alcohol component and a first carboxylic acid component. The first alcohol component contains 1,4-butanediol, and the first carboxylic acid component contains polyvalent carboxylic acid. A molar ratio of the 1,4-butanediol in the first alcohol component is not less than 30 mol %.

(1) The image forming method of the present disclosure includes: a toner image forming step (step S1 of FIG. 3), and a fixing step (step S2 of FIG. 3). In the toner image forming step, a toner image is formed on a sheet by using the toner including the first binder resin. In the fixing step, the fixing solution capable of softening the first binder resin is applied to the toner image so as to fix the toner image to the sheet.

The first binder resin is the condensate of the first alcohol component and the first carboxylic acid component. The first alcohol component contains 1,4-butanediol. The first carboxylic acid component contains the polyvalent carboxylic acid.

The molar ratio of the 1,4-butanediol in the first alcohol component is not less than 30 mol %.

According to the image forming method of the present disclosure, the toner includes, as the first binder resin, the condensate of the first alcohol component containing not less than 30 mol % of the 1,4-butanedial and the first carboxylic acid component containing the polyvalent carboxylic acid.

Accordingly, it is possible to suppress occurrence of such a situation that in a case that the second sheet is superposed on the first sheet on which the toner image is formed and to which the fixing solution is applied, the toner, of the first sheet, which is softened is transferred to the second sheet.

Further, it is also possible to suppress the occurrence of such a situation that first sheet and the second sheet are stuck together due to the softened toner.

(2) The molar ratio of the 1,4-butanediol in the first alcohol component may be not more than 65 mol %.

In a case that the molar ratio of the 1,4-butanediol in the first alcohol component is not more than 65 mol %, it is possible to easily soften the first binder resin by the fixing solution.

(3) The molar ratio of the 1,4-butanediol in the first alcohol component may be not less than 53 mol %.

By making the molar ratio of the 1,4-butanediol in the first alcohol component to be not less than 53 mol %, it is possible to further suppress occurrence of such a situation that in a case that the second sheet is superposed on the first sheet on which the toner image is formed and to which the fixing solution is applied, the toner, of the first sheet, which is softened is transferred to the second sheet.

(4) It is allowable that the first binder resin does not have an endothermic peak in a differential scanning calorimetry.

(5) The first binder resin may be amorphous.

By making the first binder resin to be amorphous, it is possible to soften the first binder resin by the fixing solution, and to fix the toner to the sheet.

(6) The first alcohol component may contain branched-chain diol.

(7) The branched-chain diol may be an alkylene oxide adduct of bisphenol A.

(8) The alkylene oxide adduct of bisphenol A may be at least one of an ethylene oxide adduct of bisphenol A and a propylene oxide adduct of bisphenol A.

(9) The alkylene oxide adduct of bisphenol A may be the ethylene oxide adduct of bisphenol A.

(10) The first alcohol component may contain only the 1,4-butanediol and the alkylene oxide adduct of bisphenol A. The first carboxylic acid component may contain only the polyvalent carboxylic acid.

(11) A molar ratio of the alkylene oxide adduct of bisphenol A to the 1,4-butanediol in the first alcohol component may be not less than 35/65 and not more than 70/30.

In a case that the molar ratio of the alkylene oxide adduct of bisphenol A to the 1,4-butanediol is not less than 35/65, it is possible to easily soften the first binder resin by the fixing solution.

In a case that the molar ratio of the alkylene oxide adduct of bisphenol A to the 1,4-butanediol is not more than 70/30, it is possible to further suppress any transfer to a rear surface (transfer of the toner to a rear surface of a sheet (the second sheet) from another sheet (the second sheet) underneath).

(12) A molar ratio of the polyvalent carboxylic acid to a total amount of the 1,4-butanediol and the alkylene oxide adduct of bisphenol A in the first alcohol component may be not less than 85/100 and not more than 90/100.

(13) The toner may further include a second binder resin. In this case, the toner has an endothermic peak in a differential scanning calorimetry.

(14) A temperature of the endothermic peak of the toner may be not less than 50° C. and not more than 250° C.

In a case that the toner includes the second binder resin and that the temperature of the endothermic peak of the toner is not less than 50° C. and not more than 250° C., it is possible to further suppress such a situation that the first sheet and the second sheet are stuck together due to the softened toner.

(15) The toner may have an exothermic peak of which temperature is lower than a temperature of the endothermic peak in the differential scanning calorimetry.

By making the toner to have the endothermic peak and the exothermic peak of which temperature is lower than the temperature of the endothermic peak, it is possible to further suppress such a situation that the first sheet and the second sheet are stuck together due to the softened toner.

(16) The temperature of the endothermic peak of the toner may be not less than 120° C. and not more than 200° C. The temperature of the exothermic peak of the toner may be less than 120° C.

(17) The second binder resin may have an endothermic peak in the differential scanning calorimetry.

(18) A temperature of the endothermic peak of the second binder resin may be not less than 50° C. and not more than 250° C.

(19) The second binder resin may be contained in an amount which is not less than 20% by mass and not more than 80% by mass in a total amount of the first binder resin and the second binder resin.

By making the second binder resin to be contained in an amount which is not less than 20% by mass in the total amount of the first binder resin and the second binder resin, it is possible to suppress any sticking (sticking of the sheets, sticking of the first and second sheets).

By making the second binder resin to be contained in an amount which is not more than 80% by mass in the total amount of the first binder resin and the second binder resin, it is possible to secure the ratio of the first binder resin in particles of the toner, and to easily fix the particles of the toner to the sheet S.

(20) The second binder resin may be a condensate of a second alcohol component and a second carboxylic acid component. The second alcohol component contains straight-chain diol having 2 to 6 carbon atoms. The second carboxylic acid component contains polyvalent carboxylic acid.

(21) The second alcohol component may contain 1,4-butanediol or ethylene glycol.

(22) The second alcohol component may contain the 1,4-butanediol and an alkylene oxide adduct of bisphenol A.

(23) The fixing solution may include an ester-based softening agent.

(24) In the fixing step, the ester-based softening agent may soften the first binder resin.

(25) The ester-based softening agent may be dibasic ester.

(26) The ester-based softening agent may be carbonic ester.

(27) The carbonic ester may be propylene carbonate.

(28) The ester-based softening agent may be aliphatic dicarboxylic acid ester.

(29) The aliphatic dicarboxylic acid ester may be at least one selected from the group consisting of: diethyl sebacate, diethyl succinate, diethoxyethyl succinate, dicarbitol succinate.

(30) A boiling point of the ester-based softening agent may be not less than 180° C.

In a case that the boiling point of the ester-based softening agent is made to be not less than 180° C., it is possible to suppress the evaporation of the ester-based softening agent. Accordingly, it is possible to suppress any generation of an odor of the ester-based softening agent.

(31) The polyvalent carboxylic acid may be aromatic dicarboxylic acid.

(32) The aromatic dicarboxylic acid may be terephthalic acid.

(33) An image forming apparatus of the present disclosure includes: a toner image forming part and a fixing part. The toner image forming part has: a photosensitive drum, a charger, an exposure device, a developing device, and a transferring roller. The charger is configured to charge a surface of the photosensitive drum. The exposure device is configured to expose the surface of the photosensitive drum. The developing device has a developing roller. The toner forming part uses the toner so as to form a toner image on a sheet.

The fixing part is configured to apply a fixing solution to the toner image so as to fix the toner image to the sheet.

The toner includes a first binder resin. The first binder resin is a condensate of a first alcohol component and a first carboxylic acid component. The first alcohol component contains 1,4-butanediol. The first carboxylic acid component contains polyvalent carboxylic acid.

A molar ratio of the 1,4-butanediol in the first alcohol component is not less than 30 mol %.

Advantageous Effects of Invention

According to the image forming method and the image forming apparatus of the present disclosure, it is possible to suppress the occurrence of such a situation that in a case that the second sheet is superposed on the first sheet on which the toner image is formed and to which the fixing solution is applied, the toner, of the first sheet, which is softened is transferred to the second sheet, and such a situation that the first sheet and the second sheet are stuck together due to the softened toner.

DESCRIPTION OF EMBODIMENT

1. Schematic of Image Forming Apparatus

The schematic or overview of an image forming apparatus will be explained.

Figure 1:
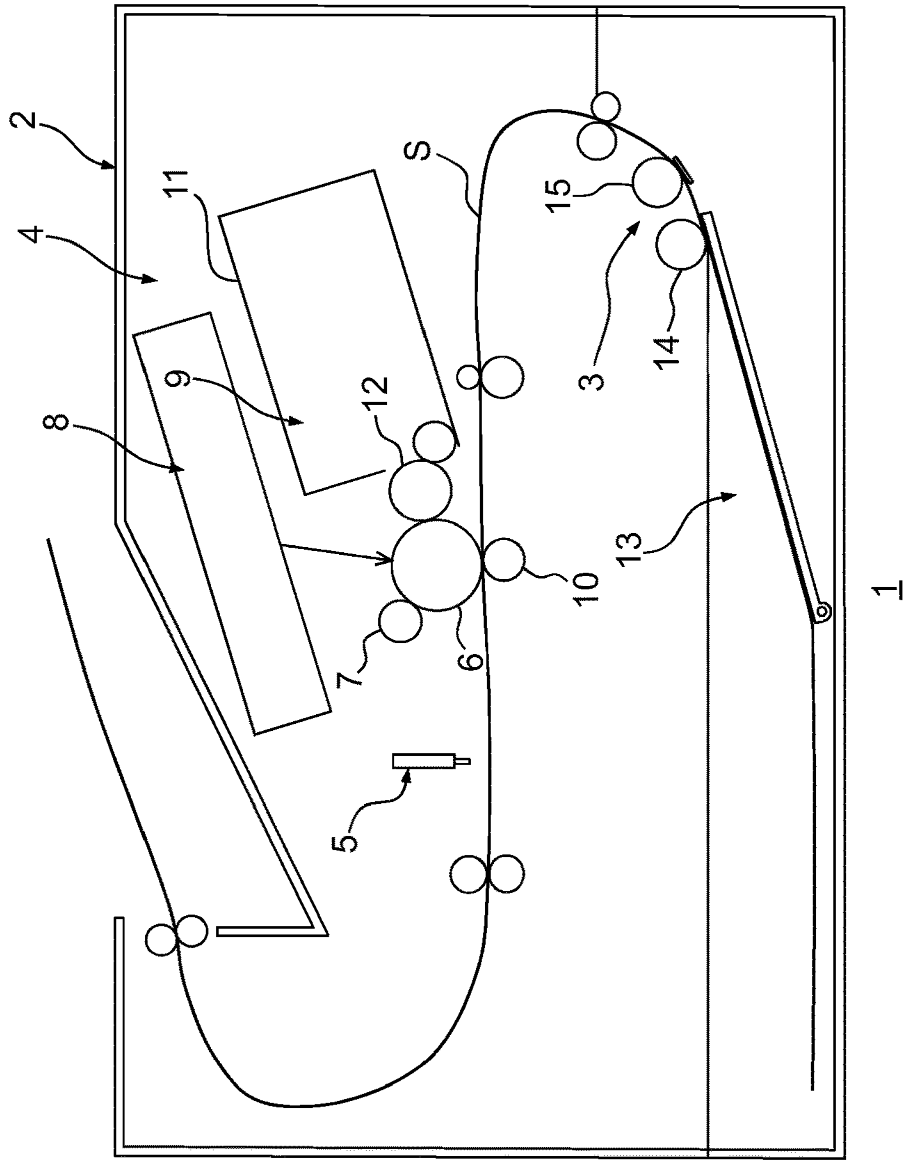
FIG. 1 is a schematic view of an image forming apparatus.

As depicted in FIG. 1, an image forming apparatus 1 includes a body casing 2, a sheet feeding part 3, a toner image forming part 4, and a fixing part 5.

1.1: Body Casing

The body casing 2 constructs the exterior of the image forming apparatus 1. The body casing 2 accommodates the sheet feeding part 3, the toner image forming part 4, and the fixing part 5.

1.2: Sheet Feeding Part

The sheet feeding part 3 is capable of supplying or feeding a sheet S to a photosensitive drum 6 of the toner image forming part 4. The photosensitive drum 6 will be explained later on. The sheet feeding part 3 includes a paper feed tray 13, a pick-up roller 14, and a paper feed roller 15. The paper feed tray 13 is capable of accommodating the sheet S. The sheet S is, for example, printing paper (printing paper sheet). The pick-up roller 14 is capable of conveying the sheet S in the paper feed tray 13 towards the paper feed roller 15. The paper feed roller 15 is capable of conveying the sheet S fed from the pick-up roller 14 towards the photosensitive drum 6.

1.3: Toner Image Forming Part

Figure 3:
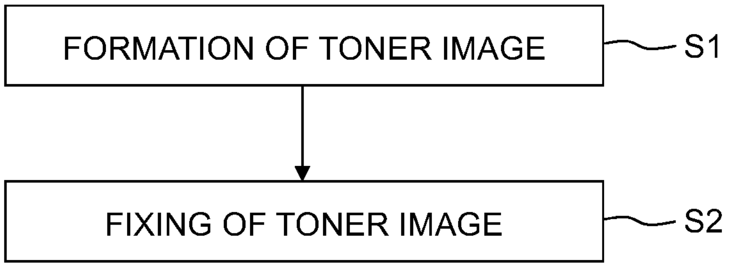
FIG. 3 is a flow chart explaining an image forming method.

The toner image forming part 4 is capable of using the toner to form the toner image in the sheet S. In other words, the toner forming part 4 is capable of executing a toner image forming step of using the toner to form the toner image in the sheet S. Namely, the image forming method includes the toner image forming step (step S1 of FIG. 3). The toner image forming part 4 has the photosensitive drum 6, a charger 7, an exposure device 8, a developing device 9, and a transfer roller 10.

The photosensitive drum 6 has a cylindrical shape. The photosensitive drum 6 is rotatable about the central axial line of the photosensitive drum 6.

The charger 7 is configured to charge a surface of the photosensitive drum 6. Specifically, the charger 7 is a charging roller. Note that the charger 7 may be a scorotron type charging device. In a case that the charger 7 is the charging roller, the charger 7 makes contact with the surface of the photosensitive drum 6. In a case that the charger 7 is the scorotron type charging device, the charger 7 is positioned to have a spacing distance with respect to the surface of the photosensitive drum 6.

The exposure device 8 is configured to expose the surface of the photosensitive drum 6. Specifically, the exposure device 8 is configured to expose the surface, of the photosensitive drum 6, which is charged by the charger 7. As a result, an electrostatic latent image is formed on the surface of the photosensitive drum 6. Specifically, the exposure device 8 is a laser scan unit. Note that the exposure device 8 may be an LED array.

The developing device 9 is configured to supply the toner to the surface of the photosensitive drum 6. This develops the electrostatic latent image and forms a toner image on the surface of the photosensitive drum 6. The developing device 9 has a toner accommodating part 11 and a developing roller 12. The toner accommodating part 11 accommodates the toner. The developing roller 12 is capable of supplying or feeding the toner in the inside of the toner accommodating part 11 to the surface of the photosensitive drum 6. The developing roller 12 makes contact with the photosensitive drum 6. Note that it is allowable that the developing roller 12 does not make contact with the photosensitive drum 6.

The developing device 9 may be configured as one process unit, together with the photosensitive drum 6 and the charger 7. The process unit may be attachable to the body casing 2.

Further, the developing device 9 may also be a developing cartridge attachable to a drum unit having the photosensitive drum 6 and the charger 7. The drum unit may be attachable to the body casing 2.

Furthermore, the developing device 9 may also be provided with: a developer including the developing roller 12; and a toner cartridge attachable to the developer. In such a case, the toner cartridge is provided with the toner accommodating part 11. Further, the developer may be provided on the drum unit. The developer may be attachable to the drum unit.

The transfer roller 10 is configured to transfer the toner image from the photosensitive drum 6 to the sheet S. Thus, the toner image is formed in the sheet S. The transfer roller 10 make contact with the photosensitive drum 6. Note that it is allowable that the transfer roller 10 does not make contact with the photosensitive drum 6.

1.4: Fixing Part

The fixing part 5 is configured to apply the fixing solution (fixing liquid) to the toner image, and to fix the toner image to the sheet S. In other words, the fixing part 5 is capable of executing a fixing step of applying the fixing solution to the toner image and fixing the toner image to the sheet. Namely, the image forming method includes the fixing step (step S2 of FIG. 3). The fixing part 5 applies the fixing solution to the toner image by spraying the fixing solution towards the toner image, without making any contact with the toner image. Note that the fixing part 5 may include a fixing roller coated with the fixing solution. The fixing roller makes contact with the toner image and applies the fixing solution to the toner image. The sheet S on which the toner image is fixed is discharged onto the upper surface of the body casing 2.

2. Details of Toner

Next, the toner will be explained in detail.

The toner contains toner particles. The toner may contain an external additive.

2.1: Toner Particles

The toner particles contain a first binder resin. Namely, the toner contains the first binder resin. The toner particles may further contain a second binder resin, a colorant, a pigment dispersant, a mold releasing agent, a magnetic body and a charge controlling agent. Namely, the toner may further contain the second binder resin.

2.1.1: First Binder Resin

The first binder resin is the base of the toner particles. The first binder resin binds components contained in the toner particles. The first binder resin is softened by the application of the fixing solution thereto: then, the first binder resin is cured to be fixed (firmly adhered) to the sheet S.

The first binder resin does not have an endothermic peak in a range of 50° C. to 250° C., in a differential scanning calorimetry. Namely, the first binder resin is amorphous and does not have a melting point in the range of 50° C. to 250° C. By making the first binder resin to be amorphous, it is possible to soften the first binder resin by the fixing solution, and to make the toner to fix to the sheet S.

Note that the endothermic peak and the melting point are measured by the differential scanning calorimetry in accordance with ASTM D3418-99. Specifically, the endothermic peak and the melting point are measured by the differential scanning calorimetry described in Examples to be described later on.

Specifically, the first binder resin is a condensate (ester) of a first alcohol component and a first carboxylic acid component.

2.1.1.1 First Alcohol Component

The first alcohol component contains 1,4-butanediol.

The molar ratio of 1,4-butanediol in the first alcohol component is not less than 30 mol %, preferably not less than 53 mol %, and/or, is, for example, not more than 65 mol %.

As described above, the first binder resin is softened in a case that the fixing solution is applied to the first binder resin, and then is cured. In a case that the molar ratio of 1,4-butanediol in the first alcohol component is not less than 30 mol %, the curing (setting) of the first binder resin is promoted, thereby making it possible to suppress the transfer (to a rear surface of a sheet from another sheet underneath), and to suppress the sticking (sticking of the sheets).

Note that the term "transfer (to a rear surface of a sheet from another sheet underneath)" is such a phenomenon that "in a case that the second sheet is superposed on the first sheet on which the toner image is formed and to which the fixing solution is applied, the toner, of the first sheet, which is softened is transferred to the second sheet". The term "sticking" is such a phenomenon that "in a case that a second sheet is superposed on a first sheet on which the toner image is formed and to which the fixing solution is applied, the first sheet and the second sheet are stuck together due to the softened toner".

By making the molar ratio of 1,4-butanediol in the first alcohol component to be not less than 53 mol %, it is possible to further suppress the transfer.

In a case that the molar ratio of 1,4-butanediol in the first alcohol component is not more than 65 mol %, it is possible to easily soften the first binder resin by the fixing solution. In a case that the molar ratio of 1,4-butanediol in the first alcohol component exceeds 65 mol %, the crystallinity of the first binder resin is increased, leading to such a case that the first binder resin is less likely to or hard be soften by the fixing solution.

The first alcohol component may further contain branched-chain diol.

The branched-chain diol is exemplified, for example, by branched-chain alkanediol such as 1,2-propanediol, and/or, for example, such as an alkylene oxide adduct of bisphenol A.

The branched-chain diol is preferably the alkylene oxide adduct of bisphenol A.

In a case that the first alcohol component contains the alkylene oxide adduct of bisphenol A, the first alcohol component may contain only the 1,4-butanediol and the alkylene oxide adduct of bisphenol A.

The alkylene oxide adduct of bisphenol A is exemplified, for example, by: an ethylene oxide adduct of bisphenol A, a propylene oxide adduct of bisphenol A, etc. The alkylene oxide adduct of bisphenol A may be the ethylene oxide adduct of bisphenol A. The alkylene oxide adduct of bisphenol A may be the propylene oxide adduct of bisphenol A. The alkylene oxide adduct of bisphenol A may be a mixture of the ethylene oxide adduct of bisphenol A and the propylene oxide adduct of bisphenol A. Namely, the alkylene oxide adduct of bisphenol A may be at least one of the ethylene oxide adduct of bisphenol A and the propylene oxide adduct of bisphenol A. The addition molar number of alkylene oxide is, for example, not less than 2 and not more than 4.

In a case that the first alcohol component contains the alkylene oxide adduct of bisphenol A, a molar ratio of the alkylene oxide adduct of bisphenol A to the 1,4-butanediol (alkylene oxide adduct of bisphenol A/1,4-butanediol) is, for example, not less than 35/65, and/or, for example, not more than 70/30, preferably mot more than 47/53. Namely, the molar ratio of the alkylene oxide adduct of bisphenol A to the 1,4-butanediol is preferably not less than 35/65 and not more than 47/53.

In a case that the molar ratio of the alkylene oxide adduct of bisphenol A to the 1,4-butanediol is less than 35/65, the crystallinity of the first binder resin is increased, leading to such a case that the first binder resin is less likely to be soften by the fixing solution, in some cases. In a case that the molar ratio of the alkylene oxide adduct of bisphenol A to the 1,4-butanediol is not less than 35/65, it is possible to easily soften the first binder resin by the fixing solution. In a case that the molar ratio of the alkylene oxide adduct of bisphenol A to the 1,4-butanediol is not more than 70/30, it is possible to further suppress the transfer (to a rear surface of a sheet from another sheet underneath). In a case that the molar ratio of the alkylene oxide adduct of bisphenol A to the 1,4-butanediol is not more than 47/53, it is possible to further more suppress the transfer.

2.1.1.2 First Carboxylic Acid Component

The first carboxylic acid component contains polyvalent carboxylic acid. Preferably, the first carboxylic acid component contains only the polyvalent carboxylic acid. In other words, the first carboxylic acid component does not contain monocarboxylic acid.

The polyvalent carboxylic acid is exemplified by: for example, aromatic dicarboxylic acids such as phthalic acid (1,2-benzenedicarboxylic acid), isophthalic acid (1,3-benzenedicarboxylic acid), terephthalic acid (1,4-benzenedicarboxylic acid), 1,4-naphthalenedicarboxylic acid, 2,6-naphthalenedicarboxylic acid, 4,4'-biphenyldicarboxylic acid, etc.; for example, aliphatic dicarboxylic acids such as oxalic acid, malonic acid, succinic acid, glutaric acid, adipic acid, pimelic acid, suberic acid, azepinic acid, sebacic acid, etc.; and for example, tricarboxylic acids such as trimellitic acid, trimesinic acid, etc. The polyvalent carboxylic acid is preferably the aromatic dicarboxylic acid. The aromatic dicarboxylic acid is preferably the terephthalic acid.

A molar ratio of the polyvalent carboxylic acid to a total amount of the first alcohol component (polyvalent carboxylic acid/the total amount of the first alcohol component) is, for example, not less than 85/100, and/or, for example, not more than 90/100.

Specifically, a molar ratio of the polyvalent carboxylic acid to a total amount of the 1,4-butanediol and the alkylene oxide adduct of bisphenol A (the polyvalent carboxylic acid/the total amount of the 1,4-butanediol and the alkylene oxide adduct of bisphenol A) is, for example, not less than 85/100, and/or, for example, not more than 90/100.

2.1.1.3: Production of First Binder Resin

In order to produce the first binder resin, the first alcohol component, the polyvalent carboxylic acid, and an esterification catalyst are charged into a reactor vessel and are heated, for example, at temperature of not less than 150° C. and not more than 250° C., for, for example, not less than 5 hours and not more than 10 hours. With this, the first binder resin can be obtained.

Specifically, in order to produce the first binder resin, the 1,4-butanediol, the alkylene oxide adduct of bisphenol A, the polyvalent carboxylic acid, and the esterification catalyst are charged into a reactor vessel and are heated, for example, at temperature of not less than 150° C. and not more than 250° C., for, for example, not less than 5 hours and not more than 10 hours. With this, the first binder resin can be obtained.

Note that the esterification catalyst is exemplified, for example, by tin (II) 2-ethylhexanoate, etc.

2.1.2: Second Binder Resin

The second binder resin is the base of the toner particles, together with the first binder resin.

The second binder resin is contained, in the total amount of the first binder resin and the second binder resin, for example, in an amount not less than 20% by mass, and/or, for example, in an amount not more than 80% by mass.

By making the second binder resin to be contained, in the total amount of the first binder resin and the second binder resin, in the amount not less than 20% by mass, it is possible to further suppress the sticking.

By making the second binder resin to be contained, in the total amount of the first binder resin and the second binder resin, in the amount not more than 80% by mass, it is possible to secure the ratio of the first binder resin in the toner particles, and to easily fix the toner particles to the sheet S. Note that in a case that the amount of the second binder resin contained in the total amount of the first binder resin and the second binder resin exceeds 80% by mass, there is such a case that the toner particles are less likely to be fixed to the sheet S.

The second binder resin binds, together with the first binder resin, the components contained in the toner particles. The second binder resin is softened by the application of the fixing solution thereto; then, the second binder resin is cured to be fixed (firmly adhered) to the sheet S. The second binder resin has an endothermic peak in the differential scanning calorimetry. Namely, the second binder resin has a crystallinity. The temperature of the endothermic peak of the second binder resin is, for example, not less than 50° C., preferably not less than 120° C., and/or, for example, not more than 250° C., preferably not more than 200° C.

By making the second binder resin to have the endothermic peak in the differential scanning calorimetry, then in a case that the toner includes the second binder resin, the toner has an endothermic peak in the differential scanning calorimetry. The temperature of the endothermic peak of the toner is, for example, not less than 50° C., preferably not less than 120° C., and/or, for example, not more than 250° C., preferably not more than 200° C.

By making the temperature of the endothermic peak of the toner to be not less than 50° C. and to be not more than 250° C., it is possible to further suppress the sticking. Further, by making the temperature of the endothermic peak of the toner to be not less than 120° C. and to be not more than 200° C., it is possible to further more suppress the sticking. The reason therefor is presumed as follows. Namely, as described above, each of the first binder resin and the second binder resin is softened by the application of the fixing solution thereto: then, each of the first and second binder resins is cured. Regarding the crystalline second binder resin, the curing after the application of the fixing solution is more advanced easily than the first binder resin which is amorphous. Accordingly, in a case that the toner particles include the second binder resin, it is therefor possible to further suppress the sticking.

Note that the endothermic peak is measured by the differential scanning calorimetry in accordance with ASTM D3418-99. Specifically, the endothermic peak is measured by the differential scanning calorimetry described in Examples to be described later on.

Note that the second binder resin may have an exothermic peak of which temperature is lower than the temperature of the endothermic peak in the differential scanning calorimetry. The temperature of the exothermic peak of the second binder resin is, for example, less than 120° C.

By making the second binder resin to have the exothermic peak in the differential scanning calorimetry, in a case that the toner includes the second binder resin, the toner has, in the differential scanning calorimetry, an exothermic peak of which temperature is lower than the temperature of the endothermic peak in the differential scanning calorimetry. In a case that the toner had the exothermic peak, it is possible to further suppress the sticking. In a case that the toner has the exothermic peak in the differential scanning calorimetry, the temperature of the exothermic peak is, for example, less than 120° C. The reason therefor is presumed as follows. Namely, the second binder resin having the exothermic peak of which temperature is lower than the temperature of the endothermic peak in the differential scanning calorimetry has a crystallinity which is lower than a crystallinity of a second binder resin not having the exothermic peak. The second binder resin having the exothermic peak has a crystallinity which is not too high, namely, has an appropriate crystallinity. Accordingly, in a case that the fixing solution is applied, the second binder resin absorbs the fixing solution in an amount to a certain extent. By making the second binder resin to absorb the fixing solution, it is possible to suppress any excessive absorption of the fixing solution by the first binder resin and any excessive softening accompanying therewith. As a result, it is possible to further suppress the sticking.

Note that the exothermic peak is measured by the differential scanning calorimetry in accordance with ASTM D3418-99. Specifically, the exothermic peak is measured by the differential scanning calorimetry described in Examples to be described later on.

Note that the temperature of the exothermic peak can be considered as the melting point. Accordingly, the second binder resin has the melting point. The melting point of the second binder resin is, for example, not less than 50° C., and/or, for example, not more than 250° C. The melting point of the second binder resin is preferably not less than 120° C., and/or, for example, not more than 200° C.

Specifically, the second binder resin is a condensate (ester) of a second alcohol component and a second carboxylic acid component.

2.1.2.1: Second Alcohol Component

The second alcohol component contains straight-chain diol having 2 to 6 carbon atoms.

The straight-chain diol having 2 to 6 carbon atoms is specifically exemplified by: straight-chain alkanediol having 2 to 6 carbon atoms such as ethylene glycol (1,2-etanediol), 1,3-propanediol, 1,4-butanediol, 1,5-pentanediol, and 1,6-hexanediol.

The second alcohol component preferably contains ethylene glycol or 1,4-butanediol.

The second alcohol component may contain branched-chain diol.

The branched-chain diol is exemplified by the branched-chain diol exemplified regarding the first alcohol component as described above.

The second alcohol component preferably contains 1,4-butanediol and an alkylene oxide adduct of bisphenol A.

2.1.2.2: Second Carboxylic Acid Component

The second carboxylic acid component contains polyvalent carboxylic acid. Specifically, the second carboxylic acid component contains only the polyvalent carboxylic acid. In other words, the second carboxylic acid component does not contain monocarboxylic acid.

The polyvalent carboxylic acid is exemplified by the polyvalent carboxylic acid exemplified regarding the first alcohol component as described above.

A molar ratio of the branched-chain diol to the straight-chain diol (branched-chain diol/straight-chain diol) in the second alcohol component is, for example, in a range of 0/100 to 40/60, in a range of 15/85 to 40/60, or in a range of 15/85 to 25/75. Further, a molar ratio the polyvalent carboxylic acid to a total amount of the second alcohol component (polyvalent carboxylic acid/the total amount of the second alcohol component) is, for example, in a range of 85/100 to 95/100, or in a range of 85/100 to 90/100. Furthermore, in view of further suppressing the sticking, in a case that the second alcohol component of the second binder resin contains 1,4-butanediol, it is preferred that a molar ratio of 1,4-butanediol in the second alcohol component is higher than a molar ratio of 1,4-butanediol in the first alcohol component of the first binder resin. With this, the crystallinity of the second binder resin can be easily increased than the crystallinity of the first binder resin. Note that the ratio of 1,4-butanediol in the second alcohol component is, for example, in a range of 60 mol % to 85 mol %, or in a range of 75 mol % to 85 mol %.

2.1.2.3: Production of Second Binder Resin

The second binder resin can be produced by a method which is same as the method of producing the first binder resin as described above.

2.1.3: Colorant

The colorant imparts a desired color to the toner particles. The colorant is dispersed in the first binder resin and the second binder resin.

The colorant is exemplified by: for example, carbon black; for example, an organic pigment such as quinophthalone yellow, Hansa yellow, isoindolinone yellow, benzidine yellow, perinone orange, perinone red, perylene maroon, rhodamine 6G rake, quinacridone red, rose bengal, copper phthalocyanine blue, copper phthalocyanine green, diketo-pyrrolo-pyrrole-based pigment, etc.; for example, inorganic pigment or metal powder such as titanium white, titanium yellow, ultramarine, cobalt blue, red oxide, aluminum powder, bronze, etc.; for example, oil-soluble or disperse dye such as azo-based dye, quinophthalon-based dye, anthraquinone-based dye, xanthene-based dye, triphenylmethane-based dye, phthalocyanine-based dye, indophenol-based dye, indoaniline-based dye, etc.; for example, a rosin-based dye such as rosin, rosin-modified phenol, rosin-modified maleic resin, etc.; and dye and/or pigment processed by high-grade fatty acid or resin; and the like. The toner particles may contain only one type of the colorant, or may contain a plurality of colorants, depending on the desired color. Further, it is allowable that the toner particles do not contain the colorant.

The blending ratio of the colorant, with respect to the total amount of 100 parts by mass of the first binder resin and the second binder resin, is, for example, not less than 2 parts by mass, preferably not less than 5 parts by mass, and/or, for example, not more than 20 parts by mass, preferably not more than 15 parts by mass.

2.1.4: Pigment Dispersant

The pigment dispersant improves the dispersibility of the colorant.

The blending ratio of the pigment dispersant, with respect to 100 parts by mass of the colorant, is, for example, not less than 0.1 parts by mass, preferably not less than 1 part by mass, and/or, for example, not more than 10 parts by mass, preferably not more than 5 parts by mass.

2.1.5: Charge Controlling Agent

The charge controlling agent imparts the electric charge property to the toner particles. The electric charge property may be either the positive charge or the negative charge. The charge controlling agent is exemplified, for example, by nigrosine-based dye, triphenylmethane-based dye, chromium-containing metal complex dye, molybdic acid chelate pigment, rhodamine-based dye, alkoxy-based amine, quaternary ammonium salt (including fluorine-modified quaternary ammonium salt), alkylamide, simple substance phosphorus or phosphorous compound, simple substance tungsten or tungsten compound, fluorine-based activator, metallic salt of salicylic acid, metallic salt of derivative of salicylic acid, and the like. Further, the charge controlling agent is exemplified by copper phthalocyanine, perylene, quinacridone, azo-based pigment, and the like. In addition, the charge controlling agent is exemplified, for example, also by a high polymer compound having a functional group such as sulfonic group, carboxyl group, quaternary ammonium salt, and the like.

The blending ratio of the charge controlling agent, with respect to the total amount of 100 parts by mass of the first binder resin and the second binder resin, is, for example, not less than 0.1 parts by mass, preferably not less than 1 part by mass, and/or, for example, not more than 20 parts by mass, preferably not more than 10 parts by mass.

2.1.6: Mold Releasing Agent

The mold releasing agent is exemplified, for example, by: polyolefin-based wax, long chain hydrocarbon-based wax, ester-based wax, etc.

The blending ratio of the mold releasing agent, with respect the total amount of 100 parts by mass of the first binder resin and the second binder resin is, for example, not less than 0 parts by mass, preferably not less than 1 part by mass, and/or, for example, not more than 20 parts by mass, preferably not more than 10 parts by mass.

2.1.7: Magnetic Body

The magnetic body is exemplified, for example, by magnetite, γ-hematite, various kinds of ferrite, and the like.

The blending ratio of the magnetic body, with respect to the total amount of 100 parts by mass of the first binder resin and the second binder resin, is, for example, not less than 10 parts by mass, preferably not less than 20 parts by mass, and/or, for example, not more than 500 parts by mass, preferably not more than 150 parts by mass. The magnetic body can also be used as the above-mentioned colorant.

2.2: External Additive

The external additive adjusts the electric charge property, the fluidity, the storage stability of the toner particles. The external additive is exemplified, for example, by inorganic particles, synthetic resin particles, etc.

The inorganic particles are exemplified, for example, by silica, aluminum oxide, titanium oxide, oxide (cooxide) of silicon and aluminum, oxide (cooxide) of silicon and titanium, a hydrophobized product thereof, etc. For example, hydrophobized silica can be obtained by processing silica fine powders with silicone oil or a silane coupling agent such as, for example, dichlorodimethylsilane, hexamethyldisilazane, tetramethyldisilazane, etc.

The synthetic resin particles are exemplified, for example, by methacrylic acid ester polymer particles, acrylic acid ester polymer particles, styrene/methacrylate copolymer particles, styrene-acrylate copolymer particles, core shell-type particles having a core of styrene polymer and a shell of methacrylate polymer, etc.

The particle size of the external additive is smaller than the particle size of the toner particles. The particle size of the external additive is, for example, not more than 2 μm, is preferably not more than 0.1 μm, and is more preferably not more than 0.03 μm.

The blending ratio of the external additive, with respect to 100 parts by mass of the toner particles, is, for example, not less than 0.1 parts by mass, and/or, for example, not more than 10 parts by mass.

2.3: Method for Producing Toner

In order to produce the toner, firstly, the toner particles are produced. The method for producing the toner particles is exemplified, for example, by the kneading/pulverizing method, the suspension/polymerization method, the emulsion polymerization/coagulation method, the emulsion/astringent method, the injection granulation method, etc.

In order to produce the toner particles, the first binder resin, the second binder resin, the charge controlling agent and the colorant are mixed and a resulting mixture is melted and kneaded by a twin-screw extruder. Next, a resulting kneaded matter is cooled and then is milled. Thus, the toner particles can be obtained.

Next, in order to prepare the toner, the external additive is then added to and mixed with the obtained toner particles. Thus, the toner can be obtained. The particle size of the toner is, in the volume median diameter (D50), for example, not less than 3 μm, preferably not less than 5 μm, and/or, for example, not more than 12 μm, preferably not more than 9 μm.

The volume median diameter (D50) is measured by the method described in Examples (to be described later on).

3. Fixing Solution

The fixing solution contains an ester-based softening agent. The fixing solution may further contain a diluent and a surfactant.

3.1: Ester-Based Softening Agent

The ester-based softening agent softens the first binder resin and the second binder resin in the above-described fixing step. With this, the fixing solution is capable of softening the first binder resin and the second binder resin in the above-described fixing step. The boiling point of the ester-based softening agent at 1 atmosphere is, for example, not less than 180° C., is preferably not less than 250° C., and/or, for example, not more than 400° C. Namely, the ester-based softening agent is less likely to evaporate in an environment in which the image forming apparatus 1 described above is used. Therefore, it is possible to suppress the occurrence of any odor of the ester-based softening agent.

The ester-based softening agent is exemplified, for example, by aliphatic carboxylic acid ester, carbonic ester, etc.

The aliphatic carboxylic acid ester is exemplified, for example, by aliphatic monocarboxylic acid ester represented by the following chemical formula (1). Further, the aliphatic carboxylic acid ester is exemplified, for example, by aliphatic dicarboxylic acid ester such as aliphatic dicarboxylic acid dialkyl represented by the following chemical formula (2), and for example, by aliphatic dicarboxylic acid dialkoxyalkyl represented by the following chemical formula (3).

R1-COO—R2 Chemical Formula (1):

(in the formula, each of R1 and R2 is a straight chain or branched alkyl group; R1 and R2 may be different from each other or same. Note that it is preferred that R1 is a straight chain or branched alkyl group having carbon atoms of which number is in a range of not less than 9 to not more than 15; and that R2 is a straight chain or branched alkyl group having carbon atom(s) of which number is in a range of not less than 1 to not more than 4).

R3(—COO—R4)2 Chemical Formula (2):

(in the formula, R3 is a straight chain or branched alkylene group; R4 is a straight chain or branched alkyl group; two pieces of R4 may be different from each other or same; note that it is preferred that R3 is a straight chain or branched alkylene group having carbon atoms of which number is in a range of not less than 2 to not more than 10; and that R4 is a straight chain or branched alkyl group having carbon atom(s) of which number is in a range of not less than 1 to not more than 8).

R5[-COO—(R6-O)*n*-R7]2 Chemical Formula (3):

(in the formula, each of R5 and R6 is a straight chain or branched alkylene group. R7 is a straight chain or branched alkyl group. Note that it is preferred that R5 is a straight chain or branched alkylene group having carbon atoms of which number is in a range of not less than 2 to not more than 10, that R6 is a straight chain or branched alkylene group having carbon atoms of which number is in a range of not less than 2 to not more than 4, and that R7 is a straight chain or branched alkyl group having carbon atom(s) of which number is in a range of not less than 1 to not more than 4. The "n" is an integer which is not less than 1. The "n" is, for example, not more than 3).

The aliphatic monocarboxylic acid ester is exemplified, for example, by ethyl decanoate (boiling point: 243° C.), ethyl laurate (boiling point: 275° C.), ethyl palmitate (boiling point: 330° C.), and the like.

The aliphatic dicarboxylic acid dialkyl is exemplified, for example, by: diethyl succinate (boiling point: 196° C.), diethyl adipate (boiling point: 251° C.), diisobutyl adipate (boiling point: 293° C.), dioctyl adipate (boiling point: 335° C.), diethyl sebacate (boiling point: 309° C.), dibutyl sebacate (boiling point: 345° C.), dioctyl sebacate (boiling point: 377° C.), and diethyl dodecanedioate (boiling point: not less than 200° C.), and the like.

The aliphatic dicarboxylic acid dialkoxyalkyl is exemplified, for example, by: diethoxyethyl succinate (boiling point: not less than 200° C.), dibutoxyethyl succinate (boiling point: not less than 200° C.), dicarbitol succinate (another name: bis(ethoxydiglycol) succinate (boiling point: not less than 200° C.), diethoxyethyl adipate (boiling point: not less than 200° C.), and the like.

The carbonic ester is exemplified, for example, by: ethylene carbonate (boiling point: 261° C.), propylene carbonate (boiling point: 242° C.), and the like.

The ester-based softening agent is preferably dibasic ester such as aliphatic dicarboxylic acid ester, carbonic ester, etc. The aliphatic dicarboxylic acid ester is at least one selected from the group consisting of: diethyl sebacate, diethyl succinate, diethoxyethyl succinate, and dicarbitol succinate. The carbonic ester is preferably propylene carbonate.

The blending ratio, in the fixing solution, of the ester-based softening agent is, for example, not less than 5% by mass, and/or, for example, not more than 100% by mass.

3.2: Diluent

The diluent is a solvent for diluting the ester-based softening agent. The ester-based softening agent may be diluted by being dispersed in the diluent. Further, the ester-based softening agent may also be diluted by dispersing the diluent in the ester-based softening agent. Furthermore, the ester-based softening agent may also be diluted by being dissolved in the diluent.

The diluent is exemplified, for example, by water; by, for example, a monohydric or polyhydric alcohol-based solvent; n-alkane; iso-paraffine; silicone oil; and the like. The monohydric or polyhydric alcohol-based solvent is exemplified, for example, by ethanol, propylene glycol, glycerol, and the like.

3.3: Surfactant

The surfactant is blended in the fixing solution so as to disperse the ester-based softening agent in the diluent. Alternatively, the surfactant is blended in the fixing solution so as to disperse the diluent in the ester-based softening agent.

The surfactant is exemplified, for example, by: an anionic surfactant such as alkylbenzene sulfonates, aliphatic sulfonates, etc.; a cationic surfactant such as aliphatic amine salts, aliphatic quaternary ammonium salts, etc.; and a nonionic surfactant such as polyoxyethylene alkyl ether, etc.

The blending ratio, in the fixing solution, of the surfactant is, for example, not less than 0.1% by mass, and/or, for example, not more than 30% by mass.

4. Effects

According to the image forming apparatus 1 and the image forming method, the toner includes, as the first binder resin, the condensate of the first alcohol component containing not less than 30 mol % of 1,4-butanediol and the first carboxylic acid component containing polyvalent carboxylic acid. Accordingly, it is possible to suppress the transfer (to a rear surface of a sheet from another sheet underneath) and the sticking.

Further, according to the image forming apparatus 1 and the image forming method, the molar ratio of 1,4-butanediol in the first alcohol component is not more than 65 mol %. Accordingly, it is possible to easily soften the first binder resin by the fixing solution.

Furthermore, according to the image forming apparatus 1 and the image forming method, the molar ratio of 1,4-butanediol in the first alcohol component is not less than 53 mol %. Accordingly, it is possible to further suppress the transfer (to a rear surface of a sheet from another sheet underneath).

Moreover, according to the image forming apparatus 1 and the image forming method, the first binder resin is amorphous. Accordingly, it is possible to soften the first binder resin by the fixing solution, and to fix the toner to the sheet S.

Further, according to the image forming apparatus 1 and the image forming method, the molar ratio of the alkylene oxide adduct of bisphenol A to the 1,4-butanediol is in not less than 35/65. Accordingly, it is possible to easily soften the first binder resin by the fixing solution.

Further, according to the image forming apparatus 1 and the image forming method, the molar ratio of the alkylene oxide adduct of bisphenol A to the 1,4-butanediol is not more than 70/30. Accordingly, it is possible to further suppress the transfer (to a rear surface of a sheet from another sheet underneath).

Furthermore, according to the image forming apparatus 1 and the image forming method, the toner includes the second binder resin. The temperature of the endothermic peak of the toner is in the range of not less than 50° C. to not more than 250° C. Accordingly, it is possible to further suppress the sticking.

Moreover, according to the image forming apparatus 1 and the image forming method, the toner has the endothermic peak and the exothermic peak of which temperature is lower than that of the endothermic peak. Accordingly, it is possible to further suppress the sticking.

Further, according to the image forming apparatus 1 and the image forming method, not less than 20% by mass of the second binder resin is contained in the total amount of the first binder resin and the second binder resin. Accordingly, it is possible to further suppress the sticking.

Furthermore, according to the image forming apparatus 1 and the image forming method, not more than 80% by mass of the second binder resin is contained in the total amount of the first binder resin and the second binder resin. Accordingly, it is possible to secure the ratio of the first binder resin in particles of the toner, and to easily fix particles of the toner to the sheet S.

Moreover, according to the image forming apparatus 1 and the image forming method, the boiling point of the ester-based softening agent is not less than 180° C. Accordingly, it is possible to suppress the evaporation of the ester-based softening agent. As a result, it is possible to suppress any generation of an odor of the ester-based softening agent.

5. Modifications

The development system of the above-described embodiment is the one-component development system using only the magnetic or non-magnetic toner, but the present invention is not limited to or restricted by the above-described embodiment.

The developing system may be, for example, the two-component development system in which a toner and a carrier are mixed. In a case that the developing system is the two-component developer, the carrier is exemplified, for example, by an alloy of a metal such as iron, ferrite, magnetite, etc., and a metal such as aluminum, lead, etc.

The carrier particle size is, for example, not less than 4 μm, preferably not less than 20 μm, and/or, for example, not more than 200 μm, preferably not more than 150 μm.

The blending ratio of toner, with respect to 100 parts by mass of the carrier, is, for example, not less than 1 part by mass, preferably is 2 parts by mass, and/or, for example, not more than 200 parts by mass, preferably not more than 50 parts by mass.

The carrier may be a resin-coated carrier, a dispersion type carrier in which a magnetic powder is dispersed in a binder resin, etc.

EXAMPLES

Next, the present invention will be explained based on Examples and Comparative Examples. Note that, however, the present invention is not limited to or restricted by the following examples.

1. Production of First Binder Resin or Second Binder Resin

Straight chain diol, branched-chain diols, polyvalent carboxylic acid which was different from trimellitic anhydride were charged to a reactor vessel (four-necked flask of 5 L)

each at a molar ratio indicated in TABLE 1 or TABLE 2. Note that the reactor vessel was equipped with a thermometer, a stainless-steel stirring rod, a rectifying column allowing hot water passing therethrough, a downflow condenser and a nitrogen introducing tube.

Then, tin (II) 2-ethylhexanoate as the esterification catalyst was charged to the reactor vessel, and under the nitrogen atmosphere, the temperature was raised to 180° C. in the inside of a mantle heater, and then was raised to 230° C. for 8 (eight) hours.

Afterwards, as necessary, the trimellitic anhydride at the molar ratio as indicated in TABLE 1 was charged into the reactor vessel and heated at 220° C., while reducing the pressure in the reactor vessel to 8.0 kPa, until the softening point of the reactant reached the softening point as indicated in TABLE 1.

Note that the softening point was measured by a flow tester "CFT-500D" (trade name) (manufactured by SHUMADZU CORPORATION. Specifically, approximately 1 g of the sample was heated from 50° C. to 200° C. at a rate of temperature rise of 6° C./minute, and a load of 1.96 MPa was applied to the sample by a plunger, and the sample was extruded from a nozzle of which diameter was 1 mm and of which length was 1 mm. The fall out amount of the plunger of the flow tester was plotted with respect to the temperature, and a temperature at which half the amount of the sample was flowed out was made to be the softening point.

By the above-described reaction, first binder resins 1A to 1H indicated in TABLE 1 and second binder resins 2A to 2D indicated in TABLE 2 were obtained. TABLE 1 and TABLE 2 indicate the glass transition temperatures and the temperatures of the endothermic peak of the obtained binder resins.

Note that the glass transition temperatures and the temperatures of the endothermic peak were measured by the differential scanning calorimetry.

The differential scanning calorimetry was performed by using a differential scanning calorimeter "DSC Q20" (trade name) (manufactured by TA INSTRUMENTS JAPAN), in accordance with ASTM D3418-99. The melting temperatures of indium and zinc were used to correct the temperature of a detecting part. The heat of fusion of the indium was used to correct the amount of heat.

Specifically, 5 mg of the obtained binder resin was placed in an aluminum pan; a vacant aluminum pan was used as a reference, and the heating was performed from −10° C. to 250° C. at a rate of temperature rise of 10° C./minute (first temperature rise).

Next, after maintaining the temperature at 250° C. for 2 (two) minutes, the temperature was lowered up to −10° C. at a rate of temperature drop of −20° C./minute (first temperature drop).

Next, after maintaining the temperature at −10° C. for 5 (five) minutes, the temperature was raised from −10° C. to 250° C. again at the rate of temperature rise of 10° C./minute (second temperature rise).

The glass transition temperature was obtained from a DSC (Differential Scanning Calorimetry) curve of a base line shift accompanying with the specific heat variation obtained in the second temperature raise. Specifically, the point of intersection of the following two lines was defined as a glass transition temperature Tg. One of the two lines is an intermediate line between a base line before the specific heat variation occurred and a base line after the specific heat variation occurred. Another of the two lines is the DSC curve.

The temperature of the endothermic peak was obtained from the apex temperature of the endothermic peak of the DSC curve obtained at the time of the first temperature rise.

Tables 1 and 2 (Following)—Legend

BPA-EO indicates an ethylene oxide adduct of bisphenol A.

TABLE 1

| | | 1A | 1B | 1C | 1D |
|---|---|---|---|---|---|
| Straight-chain diol (molar ratio) | 1,4-butanediol | 30 | 50 | 53 | 57.5 |
| Branched-chain diol (molar ratio) | BPA-EO* | 70 | 50 | 47 | 42.5 |
| | 1,2-propanediol | | | | |
| Polyvalent carboxylic acid (molar ratio) | Terephthalic acid | 85 | 90 | 83 | 90 |
| | Trimellitic anhydride | | | 3 | |
| Physical property | Softening point (° C.) | 98.5 | 108.6 | 105.3 | 105.2 |
| | Glass-transition point (° C.) | 58.9 | 59.5 | 57.2 | 57.1 |
| | Endothermic peak (° C.) | none | none | none | none |

| | | 1E | 1F | 1G | 1H |
|---|---|---|---|---|---|
| Straight-chain diol (molar ratio) | 1,4-butanediol | 63 | 65 | 40 | |
| Branched-chain diol (molar ratio) | BPA-EO* | 37 | 35 | | 100 |
| | 1,2-propanediol | | | 60 | |
| Polyvalent carboxylic acid (molar ratio) | Terephthalic acid | 85 | 85 | 85 | 80 |
| | Trimellitic anhydride | 8 | 5 | 5 | 2 |
| Physical property | Softening point (° C.) | 109.7 | 110.5 | 131 | 94.6 |
| | Glass-transition point (° C.) | 49.8 | 47.9 | 65.4 | 56.9 |
| | Endothermic peak (° C.) | none | none | none | none |

TABLE 2?

| | | 2A | 2B | 2C | 2D |
|---|---|---|---|---|---|
| Straight-chain diol (molar ratio) | 1,4-butanediol | 75 | 85 | 60 | |
| | Ethylene glycol | | | | 100 |
| Branched-chain diol (molar ratio) | BPA-EO* | 25 | 15 | | |
| | 1,2-propanediol | | | 40 | |
| Polyvalent carboxylic acid (molar ratio) | Terephthalic acid | 90 | 85 | 85 | |
| | Sebacic acid | | | | 95 |
| Physical property | Softening point (° C.) | 144.5 | 190.3 | 135.5 | 83.2 |
| | Glass-transition point (° C.) | 48.9 | 48.2 | 40.6 | none |
| | Endothermic peak (° C.) | 155.2 | 192 | 145.6 | 77.6 |

2. Production of Toner

The parts by mass of the first binder resin and the parts by mass of the second binder resin as indicated in TABLE 3 to TABLE 6 as follows, 3 parts by mass of BONTRON (trade name) N-04 (charge controlling agent, manufactured by ORIENT CHEMICAL INDUSTRIES CO., LTD.), 7 parts by mass of FCA-F201-PS (charge controlling agent, manufactured by FUJIKURA CHEMICAL Co.), and 6 parts by mass of REGAL (trade name) 330R (colorant, carbon black; manufactured by CABOT SPECIALTY CHEMICALS, INC.) were mixed by using a Henschel mixer.

Next, the obtained mixture was melted and kneaded by a twin-screw extruder.

Next, the obtained kneaded matter was cooled and ground to about 1 mm by using a hammer mill.

Next, the obtained pulverized (ground) product was then further milled with a pulverizer (crusher) of the air-jet system.

Next, the obtained pulverized (ground) product was then classified so as to obtain toner particles with a volume median diameter (D50) of 7.5 μm.

Note that Coulter Multisizer II (trade name) (produced by BECKMAN COULTER INC.) was used so as to measure the volume median diameter (D50) at an aperture diameter of 100 μm. As an analysis software, Coulter Multisizer AccuComp (trade name) Version 1.19 (produced by BECKMAN COULTER INC.) was used. Specifically, as a dispersion solution, a solution in which 5% by mass of EMULGEN (trade name) 109P (manufactured by KAO CORPORATION, polyoxyethylene lauryl ether, HLB (Griffin): 13.6) was dissolved in an electrolytic solution (ISOTON (trade name) II, produced by BECKMAN COULTER INC.). 10 mg of the toner particles were added to 5 ml of the dispersion solution, and was subjected to dispersion for 1 (one) minute with an ultrasonic dispersing apparatus US-1 (manufactured by SND CO., LTD., output: 80 W). Next, 25 ml of the electrolytic solution was added, and the dispersion was further performed for 1 (one) minute with the ultrasonic dispersing apparatus US-1, and thus a sample dispersion fluid was prepared. Next, the sample dispersion solution was added to 100 ml of the electrolytic solution so that a concentration by which the particle size of 30,000 pieces of particles could be measured by 20 (twenty) seconds was provided; the measurement was performed for 30,000 pieces of the particles; and the volume median diameter (D50) was obtained from the particle size distribution.

Next, 0.5 parts by mass of NAX-50 (external additive, hydrophobic silica; manufactured by AEROSIL JAPAN) and 0.5 parts by mass of RX-300 (external additive, hydrophobic silica; manufactured by NIPPON AEROSIL CO., LTD.) were added and mixed to 100 parts by mass of the obtained toner particles, by using the Henschel mixer.

Thus, the toner was obtained. TABLE 3 to TABLE 6 indicate the temperature of endothermic peak and the temperature of the exothermic peak of the obtained toner.

Note that the temperature of endothermic peak and the temperature of the exothermic peak were measured by the differential scanning calorimetry as described above. The temperature of the exothermic peak was obtained from the apex temperature of the exothermic peak of the DSC curve obtained at the time of the first temperature rise.

Tables 3 to 6 (Following)—Legend

EX. indicates Example.
COM. EX. indicates Comparative Example.

TABLE 3

| | | | EX. 1 | EX. 2 | EX. 3 | EX. 4 | EX. 5 | EX. 6 | COM. EX. |
|---|---|---|---|---|---|---|---|---|---|
| Toner | First binder resin (part by mass) | 1A | 100 | | | | | | |
| | | 1B | | 100 | | | | | |
| | | 1C | | | 100 | | | | |
| | | 1D | | | | 100 | 70 | | |
| | | 1E | | | | | | 100 | |
| | | 1F | | | | | 30 | | |
| | | 1G | | | | | | | |
| | | 1H | | | | | | | 100 |
| | Second binder resin (part by mass) | 2A | | | | | | | |
| | | 2B | | | | | | | |
| | | 2C | | | | | | | |
| | | 2D | | | | | | | |
| | Exothermic peak (° C.) | | none | none | none | none | none | none | none |
| | Endothermic peak (° C.) | | none | none | none | none | none | none | none |
| Fixing solution (part by mass) | Diethyl sebacate | | 100 | 100 | 100 | 100 | 100 | 100 | 100 |
| | Diethyl succinate | | | | | | | | |
| | Diethoxyethyl succinate | | | | | | | | |
| | Dicarbitol succinate | | | | | | | | |
| | Propylene carbonate | | | | | | | | |
| Evaluation | Sticking | | C | C | C | C | C | C | D |
| | Transfer | | B | B | A | A | A | A | D |

TABLE 4

| | | | EX. 7 | EX. 8 | EX. 9 | EX. 10 | EX. 11 | EX. 12 |
|---|---|---|---|---|---|---|---|---|
| Toner | First binder resin (part by mass) | 1A | 70 | | | | | |
| | | 1B | | 70 | | | | |
| | | 1C | | | 70 | | | |
| | | 1D | | | | 70 | 70 | 70 |
| | | 1E | | | | | | |
| | | 1F | | | | | | |
| | | 1G | | | | | | |
| | | 1H | | | | | | |
| | Second binder resin (part by mass) | 2A | 30 | 30 | 30 | 30 | | |
| | | 2B | | | | | 30 | |
| | | 2C | | | | | | 30 |
| | | 2D | | | | | | |
| | Exothermic peak (° C.) | | 94 | 94 | 96 | 96 | 108 | 99 |
| | Endothermic peak (° C.) | | 135 | 137 | 141 | 138 | 184 | 129 |

TABLE 4-continued

| | | EX. 7 | EX. 8 | EX. 9 | EX. 10 | EX. 11 | EX. 12 |
|---|---|---|---|---|---|---|---|
| Fixing solution (part by mass) | Diethyl sebacate | 100 | 100 | 100 | 100 | 100 | 100 |
| | Diethyl succinate | | | | | | |
| | Diethoxyethyl succinate | | | | | | |
| | Dicarbitol succinate | | | | | | |
| | Propylene carbonate | | | | | | |
| Evaluation | Sticking | A | A | A | A | A | A |
| | Transfer | B | B | A | A | A | A |

TABLE 5

| | | | EX. 13 | EX. 14 | EX. 15 | EX. 16 |
|---|---|---|---|---|---|---|
| Toner | First binder resin (part by mass) | 1A | | | | |
| | | 1B | | | | |
| | | 1C | | | | |
| | | 1D | 70 | 70 | 70 | 70 |
| | | 1E | | | | |
| | | 1F | | | | |
| | | 1G | | | | |
| | | 1H | | | | |
| | Second binder resin (part by mass) | 2A | 30 | 30 | 30 | 30 |
| | | 2B | | | | |
| | | 2C | | | | |
| | | 2D | | | | |
| | Exothermic peak (° C.) | | 96 | 96 | 96 | 96 |
| | Endothermic peak (° C.) | | 138 | 138 | 138 | 38 |
| Fixing solution (part by mass) | Diethyl sebacate | | | | | |
| | Diethyl succinate | | 100 | | | |
| | Diethoxyethyl succinate | | | 100 | | |
| | Dicarbitol succinate | | | | 100 | |
| | Propylene carbonate | | | | | 100 |
| Evaluation | Sticking | | A | A | A | A |
| | Transfer | | A | A | A | A |

TABLE 6

| | | | EX. 17 | EX. 18 | EX. 19 | EX. 20 | EX. 21 |
|---|---|---|---|---|---|---|---|
| Toner | First binder resin (part by mass) | 1A | | | | | |
| | | 1B | | | | | |
| | | 1C | | | | | |
| | | 1D | 20 | 80 | 80 | | |
| | | 1E | | | | 70 | |
| | | 1F | | | | | |
| | | 1G | | | | | 70 |
| | | 1H | | | | | |
| | Second binder resin (part by mass) | 2A | 80 | 20 | | 30 | 30 |
| | | 2B | | | | | |
| | | 2C | | | | | |
| | | 2D | | | 20 | | |
| | Exothermic peak (° C.) | | 20 | 117 | none | 95 | 94 |
| | Endothermic peak (° C.) | | 130 | 146 | 77 | 138 | 138 |
| Fixing solution (part by mass) | Diethyl sebacate | | 100 | 100 | 100 | 100 | 100 |
| | Diethyl succinate | | | | | | |
| | Diethoxyethyl succinate | | | | | | |
| | Dicarbitol succinate | | | | | | |
| | Propylene carbonate | | | | | | |
| Evaluation | Sticking | | A | A | B | A | A |
| | Transfer | | A | A | A | A | A |

3. Preparation of Sample for Evaluation

The obtained toner was filled into a developing cartridge and a toner image of which toner adhesion amount was 5 g/$m^2$ was formed on a front surface of a first sheet by using an image forming apparatus "HL-L2360D" (manufactured by BROTHER INDUSTRIES., LTD.) from which a thermal fixing device was removed. Since the thermal fixing device was removed, the toner image was not fixed to the first sheet.

Figure 2:
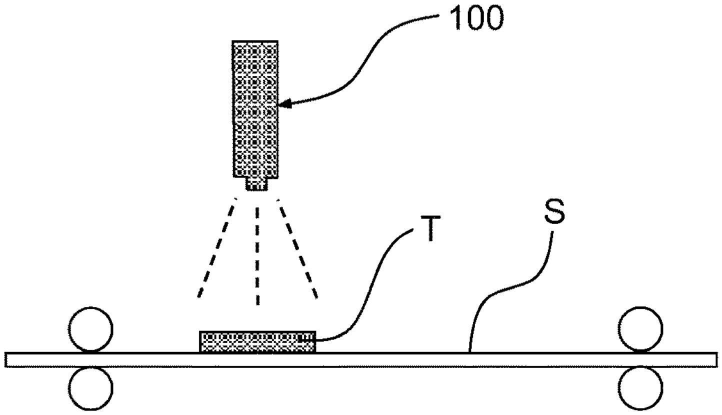
FIG. 2 is a schematic view of an off-line fixing device usable for evaluating the fixing property.

Next, an off-line fixing device having an atomizer 100 as depicted in FIG. 2 mounted thereon was used so as to spray each of fixing solutions indicated in TABLE 3 to TABLE 6, to a toner image T with an atomization amount of 0.1 g of the fixing solution per A4 size. Note that the atomizer 100 is an air brush which sprays the fixing solution by using compressed air.

After elapse of 30 minutes since the spraying of the fixing solution to the toner image T, a second sheet was overlaid on the front surface, of the first sheet, on which the toner image T was formed; a weight was placed on a part, of the overlaid sheets, in which the toner image T was formed, such that pressure of 150 g/$cm^2$ was applied to the part; then, the overlaid sheets was then left to stand in a thermostatic chamber for 24 hours, at the temperature of 25° C. and the humidity of 30%.

Thus, a sample for evaluation was obtained.

4. Evaluation

The second sheet was peeled off or removed from the first sheet of the obtained sample of evaluation, and the transfer (of the tonner to a rear surface of the second sheet from the first sheet) and the sticking (of the first and second sheets) were evaluated in accordance with the following criteria for evaluation. The results are indicated in TABLE 3 to TABLE 6. Note that in the following evaluation criteria, "A" to "C" are of the practically problem-free level.

4.1: Evaluation Criterion for Transfer

A: Any transfer was hardly observed.

B: A slight transfer was observed.

C: A transfer was observed, but was acceptable as a printed matter (printed article).

D: Much transfer was observed, and was not acceptable as the printer matter.

4.2: Evaluation Criterion for Sticking

A: Any sticking was not felt.

B: Any sticking was hardly felt.

C: A slight sticking was felt, and a slight peeling sound was produced.

D: Sticking occurred at a large part, and a peeling sound was produced.

As indicated in TABLE 3 to TABLE 6, Examples 1 to 21 had satisfactory results in the transfer and in the sticking, and were of the practically problem-free level.

In particular, Examples 3 to 6 and 9 to 21 in each of which the molar ratio of the 1,4-butandiol in the first alcohol component was not less than 53 mol % had a further satisfactory result in the evaluation of the transfer, as compared with Examples 1 and 7 in each of which the above-described molar ratio was 30 mol % and Examples 2 and 8 in each of which the above-described molar ratio was 50 mol %.

Further, Examples 7 to 21 each of which used the first binder resin and the second binder resin in combination had a further satisfactory result in the evaluation of the sticking, as compared with Examples 1 to 6 each of which did not use the second binder resin.

Furthermore, Examples 7 to 18, 20 and 21 in each of which the temperature of the endothermic peak of the toner was in the range of 120° C. to 200° C. and the temperature of the exothermic peak of the toner was less than 120° C. had a further satisfactory result in the evaluation of the sticking, as compared with Examples 1 to 6 in each of which the exothermic peak and the endothermic peak were not present and Example 19 in which the temperature of the endothermic peak of the toner was 77° C. and the exothermic peak was not present.

On the other hand, Comparative Example 1 which did not contain the 1,4-butanediol in the first alcohol component of the toner had unsatisfactory results in the evaluations of the transfer and sticking, and was of a problematic level in the practical use.

REFERENCE SIGNS LIST

1: image forming apparatus
4: toner image forming part
5: fixing part
6: photosensitive drum
7: charger
8: exposure device
9: developing device
10: transfer roller
11: toner accommodating part
12: developing roller
S: sheet

The invention claimed is:

1. An image forming method comprising:

forming a toner image on a sheet by using a toner including a first binder resin; and applying, to the toner image, a fixing solution capable of softening the first binder resin so as to fix the toner image to the sheet, wherein the first binder resin is a condensate of a first alcohol component and a first carboxylic acid component, the first alcohol component containing 1,4-butanediol, and the first carboxylic acid component containing polyvalent carboxylic acid; and a molar ratio of the 1,4-butanediol in the first alcohol component is not less than 30 mol %.

2. The image forming method according to claim 1, wherein the molar ratio of the 1,4-butanediol in the first alcohol component is not more than 65 mol %.

3. The image forming method according to claim 1, wherein the molar ratio of the 1,4-butanediol in the first alcohol component is not less than 53 mol %.

4. The image forming method according to claim 1, wherein the first binder resin is amorphous.

5. The image forming method according to claim 1, wherein the first alcohol component further contains branched-chain diol.

6. The image forming method according to claim 1, wherein the toner further includes a second binder resin, and has an endothermic peak in a differential scanning calorimetry.

7. The image forming method according to claim 6, wherein a temperature of the endothermic peak of the toner is in a range of 50° C. to 250° C.

8. The image forming method according to claim 6, wherein the toner has an exothermic peak of which temperature is lower than a temperature of the endothermic peak in the differential scanning calorimetry, and the temperature of the endothermic peak of the toner is in a range of 120° C. to 200° C.; and the temperature of the exothermic peak of the toner is less than 120° C.

9. The image forming method according to claim 6, wherein the second binder resin is contained in a range of 20% by mass to 80% by mass in a total amount of the first binder resin and the second binder resin.

10. The image forming method according to claim 6, wherein the second binder resin is a condensate of a second alcohol component and a second carboxylic acid component, the second alcohol component containing straight-chain diol having 2 to 6 carbon atoms, and the second carboxylic acid component containing polyvalent carboxylic acid.

11. The image forming method according to claim 10, wherein the second alcohol component contains 1,4-butanediol or ethylene glycol.

12. The image forming method according to claim 10, wherein the second alcohol component contains 1,4-butanediol and an alkylene oxide adduct of bisphenol A.

13. The image forming method according to claim 1, wherein the fixing solution includes an ester-based softening agent, and in the fixing of the toner image to the sheet, the ester-based softening agent softens the first binder resin.

14. The image forming method according to claim 13, wherein the ester-based softening agent is dibasic ester.

15. The image forming method according to claim 13, wherein the ester-based softening agent is propylene carbonate.

16. The image forming method according to claim 13, wherein the ester-based softening agent is aliphatic dicarboxylic acid ester.

17. The image forming method according to claim 16, wherein the aliphatic dicarboxylic acid ester is at least one selected from the group consisting of: diethyl sebacate, diethyl succinate, diethoxyethyl succinate, and dicarbitol succinate.

18. The image forming method according to claim 1, wherein the polyvalent carboxylic acid is aromatic dicarboxylic acid.

19. The image forming method according to claim 18, wherein the aromatic dicarboxylic acid is terephthalic acid.

20. An image forming apparatus comprising:

a toner image forming part which has a toner accommodating part accommodating a toner, and which is configured to form a toner image on a sheet by using the toner; and a fixing part configured to apply a fixing solution to the toner image so as to fix the toner image to the sheet, wherein the toner is a condensate of a first alcohol component and a first carboxylic acid component, the first alcohol component containing 1,4-butanediol, and the first carboxylic acid component containing polyvalent carboxylic acid; and a molar ratio of the 1,4-butanediol in the first alcohol component is not less than 30 mol %.

* * * * *